(12) United States Patent
Wentworth

(10) Patent No.: US 8,505,144 B2
(45) Date of Patent: Aug. 13, 2013

(54) COUNTER-BALANCED TOP WHEEL FOR A VEHICLE WASH SYSTEM

(75) Inventor: Robert J. Wentworth, Farmington Hills, MI (US)

(73) Assignee: Motor City Wash Works, Inc., Northville, MI (US)

( * ) Notice: Subject to any disclaimer, the term of this patent is extended or adjusted under 35 U.S.C. 154(b) by 1329 days.

(21) Appl. No.: 12/033,174

(22) Filed: Feb. 19, 2008

(65) Prior Publication Data

US 2009/0205148 A1    Aug. 20, 2009

(51) Int. Cl.
*B60S 3/06* (2006.01)

(52) U.S. Cl.
USPC ............... 15/53.2; 15/DIG. 2; 187/254

(58) Field of Classification Search
USPC ........... 15/53.1–53.4, 97.3, DIG. 2; 254/4 R, 254/390; 187/254
See application file for complete search history.

(56) References Cited

U.S. PATENT DOCUMENTS

| | | | |
|---|---|---|---|
| 2,777,667 A * | 1/1957 | Stafford et al. | 254/4 R |
| 3,281,877 A * | 11/1966 | Cirino et al. | 15/53.2 |
| 3,292,192 A * | 12/1966 | Maxwell | 15/53.3 |
| 3,526,012 A * | 9/1970 | Cirino | 15/53.2 |
| 3,688,329 A | 9/1972 | Capra | |
| 3,822,429 A | 7/1974 | Thompson | |
| 3,823,356 A | 7/1974 | Paavola et al. | |
| 4,196,486 A | 4/1980 | Capra | |
| 4,753,322 A * | 6/1988 | Yasuda | 187/254 |
| 4,798,217 A | 1/1989 | Hanna | |
| 4,815,158 A * | 3/1989 | Crotts | 15/53.2 |
| 5,566,508 A | 10/1996 | Houston | |
| 5,613,260 A | 3/1997 | Belanger et al. | |
| 5,713,092 A | 2/1998 | Belanger et al. | |
| 5,722,104 A * | 3/1998 | Wentworth | 15/53.2 |
| 7,361,125 B2 | 4/2008 | Webber et al. | |
| 7,681,274 B2 * | 3/2010 | Belanger | 15/53.2 |
| 2007/0209128 A1 | 9/2007 | Belanger | |
| 2008/0029135 A1 | 2/2008 | McCadden et al. | |

* cited by examiner

*Primary Examiner* — Lee D Wilson
*Assistant Examiner* — Tyrone V Hall, Jr.
(74) *Attorney, Agent, or Firm* — Quinn Law Group, PLLC

(57) ABSTRACT

A counter-balanced top wheel assembly for laundering a vehicle includes a frame. A brush support arm having a first end and a second end is pivotally mounted to the frame adjacent the first end. A counterweight support arm having a first end and a second end is pivotally mounted to the frame adjacent the first end. The second end of the brush support arm is in communication with a brush such that the brush extends over a vehicle bay to launder an exterior of the vehicle. The assembly includes a pulley mechanism with a strap connecting the brush support arm to the counterweight support arm. The brush support arm and the counterweight support arm extend away from the frame in the same direction. The assembly is configured such that the brush applies consistent weight to the exterior of the vehicle throughout its entire arc of travel.

28 Claims, 2 Drawing Sheets

COUNTER-BALANCED TOP WHEEL FOR A VEHICLE WASH SYSTEM

BACKGROUND OF THE INVENTION

1. Field of the Invention

The present invention relates generally to a counter-balanced top wheel assembly for laundering a vehicle. More specifically, the present invention relates to a counter-balanced top wheel assembly for a vehicle wash system that is compact and provides significant space savings.

2. Description of the Prior Art

Vehicle treatment locations and laundering systems using top wheel assemblies such as, rotating brushes for cleaning and/or polishing the exterior surfaces of automotive vehicles are well known and in widespread commercial use throughout the United States. A typical top wheel assembly includes a single arm having a brush support segment and a counterweight support segment extending from opposite sides of a frame. The frame serves as the fulcrum point for the brush support segment and the counterweight support segment. The brush is carried at one end of the brush support segment and a counterweight of appropriate weight is carried at the opposite end. The counterweight, fulcrum points and relative segment lengths on either side of the fulcrum points may be chosen to produce an essentially neutral pivotal structure requiring little power to move it through its angular range of motion. The structure resembles a teeter-totter of opposite pivot segment lengths, which maintain a constant 180° angular relation between them.

A problem associated with an arrangement of this type arises out of the fact that space must be allocated on both sides of the frame which support the pivot segments; i.e. the fulcrums of the segments are centered at the frame and the segments extend in both directions therefrom. This problem becomes particularly acute in tunnel or conveyor type vehicle treatment locations where longitudinal space along the conveyor is at a premium because, for example, of the desire to add accessories to the laundering systems; e.g., tire scrubbers, underbody sprays, wax sprays, and blower arches for drying the vehicle.

It therefore would be desirable to provide a top wheel assembly that overcomes the disadvantages present with current assemblies.

SUMMARY OF THE INVENTION AND ADVANTAGES

It is therefore an advantage of the present advantage to provide a counter-balanced top wheel assembly that takes up less space in the vehicle wash system than existing top wheel assemblies.

It is a related advantage of the present invention to provide a counter-balanced top wheel assembly where the arm portions are located on or extend from the same side of the support frame.

It is another advantage of the present advantage to provide a counter-balanced top wheel assembly that automatically senses and adjusts the position of the top wheel with respect to an upper surface of the vehicle to control the downward force or pressure applied thereby.

In accordance with the above and the other advantages of the present invention, a counter-balanced top wheel assembly for laundering a vehicle is provided. The assembly includes a frame, a brush support arm, and a counterweight support arm. The brush support arm includes a first end and a second end and is pivotally mounted to the frame adjacent the first end.

The counterweight support arm includes a first end and a second end and is pivotally mounted to the frame adjacent the first end. The second end of the brush support arm is in communication with a brush and positions the brush over a vehicle bay to contact and launder an exterior of the vehicle that passes therethrough. The brush support arm and the counterweight support arm are connected by a strap of a pulley mechanism. The second end of the brush support arm and the second end of the counterweight support arm extend from the frame in the same direction. The vehicle contact with the brush moves (i.e. raises) it and changes the relative angular positions of the brush support arm and the counterweight support arm through the strap connecting the two arms.

These and other features and advantages of the present invention will become apparent to one of ordinary skill in the art from the following description of the invention, when viewed in accordance with the accompanying drawings and appended claims.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
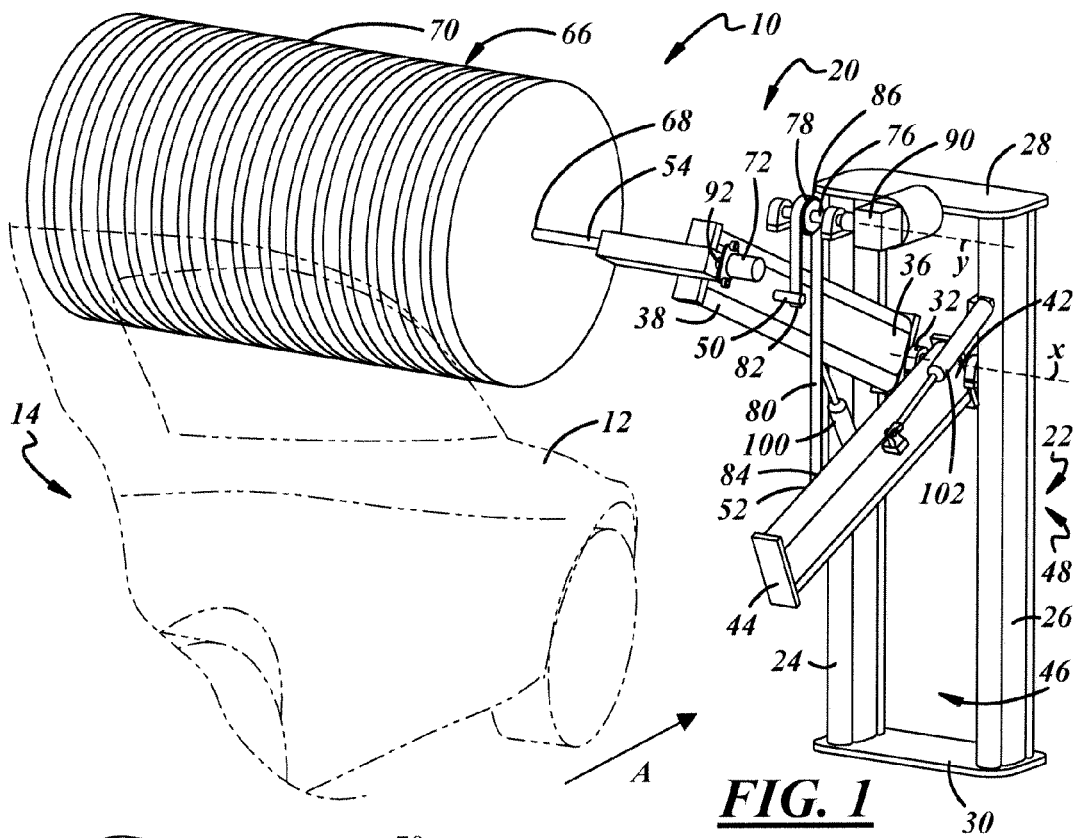
FIG. 1 is a perspective view of a counter-balanced top wheel assembly in accordance with one embodiment of the present invention.

Referring to FIGS. 1 through 4, a vehicle washing system in accordance with the present invention is illustrated and generally designated by reference number 10. The vehicle washing system 10 includes a counter-balanced top wheel assembly 20. In the embodiments shown and described, the counter-balanced top wheel assembly 20 is generally shown for laundering an upper exterior surface of a vehicle 12 as it proceeds along a predetermined path of travel in a horizontal direction in a treatment bay 14. The path of the vehicle is generally indicated by the arrow A in FIG. 1. However, it will be understood by one of ordinary skill in the art that the counter-balanced top wheel assembly 20 can be configured to contact other exterior surfaces of the vehicle 12 other than or in addition to its upper surface. It will also be understood by one of ordinary skill in the art that the counter-balanced top wheel assembly may be utilized for a variety of different functions in the vehicle washing system.

It will be appreciated that the counter-balanced top wheel assembly 20 is generally shown and described as incorporated into a vehicle washing system where the vehicle moves with respect to the system. However, it will be understood that it may also be incorporated into a system where the vehicle is stationary and the top wheel assembly moves with respect to the vehicle.

Referring to the Figures, wherein like numerals indicate corresponding parts throughout the several views, the counter-balanced top wheel assembly 20 is generally shown for laundering the exterior of the vehicle 12 as it proceeds along the predetermined path of travel in the direction indicated by the arrow A. The assembly 20 includes a frame 22 generally located proximate the vehicle treatment location or vehicle bay 14. The frame 22 includes a first support leg 24 and a second support leg 26 that are spaced horizontally from each other and extend vertically between a top plate 28 and a bottom plate 30. The frame 22 is preferably secured to the floor, however, it will be understood that it could alternatively be secured to the wall, ceiling or other suitable structure. Additionally, it will also be understood by one of ordinary skill in the art that the frame 22 can take on a variety of different configurations and can be constructed of a variety of suitable materials.

The frame 22 includes at least one support pivot arm 32 secured to the frame 22 and positioned to extend generally horizontally between the first leg 24 and the second leg 26. The at least one support pivot arm 32 is fixed to the frame 22 and defines a first support pivot axis X. The frame 22 may also include a plurality of support pivot arms 32 fixedly coupled thereto and/or a plurality support pivot axes X defined thereby, as discussed in more detail below. If multiple support pivot arms 32 are utilized, they may rotate separately about the same support pivot axis X or on separate support pivot axes.

The assembly 20 includes a brush support arm 34, having a first end 36 and a second end 38. The brush support arm 34 is pivotally mounted to the at least one support pivot arm 32 adjacent the first end 36 such that the brush support arm 34 can rotate about the support pivot axis X in a generally arcuate fashion. The assembly 20 also includes a counterweight support arm 40, having a first end 42 and a second end 44. As shown, the counterweight support arm 40 is pivotally mounted to the at least one support pivot arm 32 adjacent the first end 42 such that the counterweight support arm end 40 can rotate about the support axis in a generally arcuate fashion. As discussed above, the counterweight support arm 40 can be pivotally mounted to a separate support pivot arm, which may have the same axis of rotation X or a different axis of rotation. However, the axes should be parallel and the movements of the arms 34 and 40 should be equal and opposite.

The counterweight support arm 40 is horizontally offset from the brush support arm 34. In the preferred embodiment, the brush support arm 34 and the counterweight support arm 40 extend outwardly from the frame 22 away from the same side thereof. The frame 22 preferably has a front side 46 and a rear side 48 and the brush support arm 34 and the counterweight support arm 40 extend outwardly from the front side 46. As shown, the brush support arm 34 extends outwardly and upwardly at an angle such that the second end 38 is positioned or oriented above the first end 36. Conversely, the counterweight support arm 40 extends outwardly and downwardly at an angle such that the second end 44 is positioned or oriented below the first end 42. Each of the brush support arm 34 and the counterweight support arm 40 include a pulley support restraint 50, 52 that extends outwardly from each of the respective support arms 34, 40 towards the other of the support arms 34, 40. In a preferred embodiment, the pulley support restraint 50, 52 is an attachment pin. However, it will be understood by one of ordinary skill in the art that the pulley support restraint 50, 52 can be any other suitable attachment mechanism. It will also be understood that the arms 34, 40 could alternatively extend from the rear side 48 of the frame 22.

Figure 2:
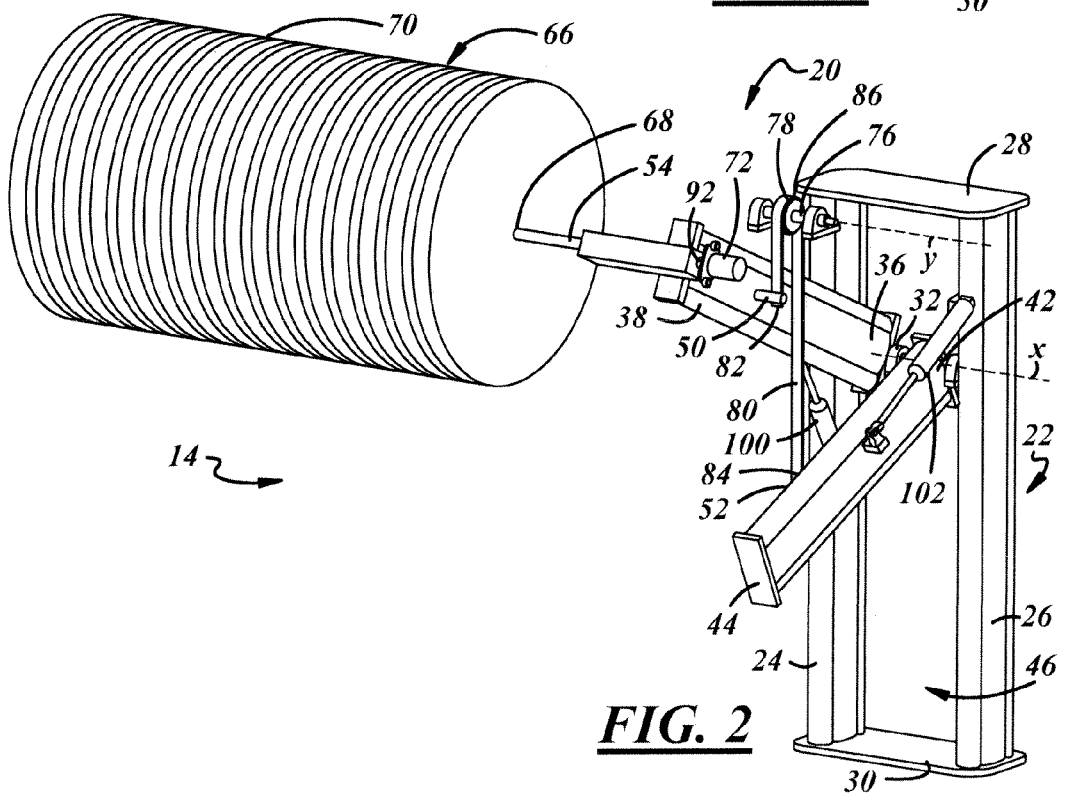
FIG. 2 is a perspective view of a counter-balanced top wheel assembly in accordance with another embodiment of the present invention.

The second end 38 of the brush support arm 34 is in communication with a rotatable shaft 54. The rotatable shaft 54 extends perpendicularly with respect to the brush support arm 34 such that it extends over the vehicle bay 14 and into communication with the horizontal path of travel of the vehicle. As shown in FIGS. 1 and 2, the rotatable shaft 54 is secured directly to the brush support arm 34 adjacent the second end 38.

Figure 3:
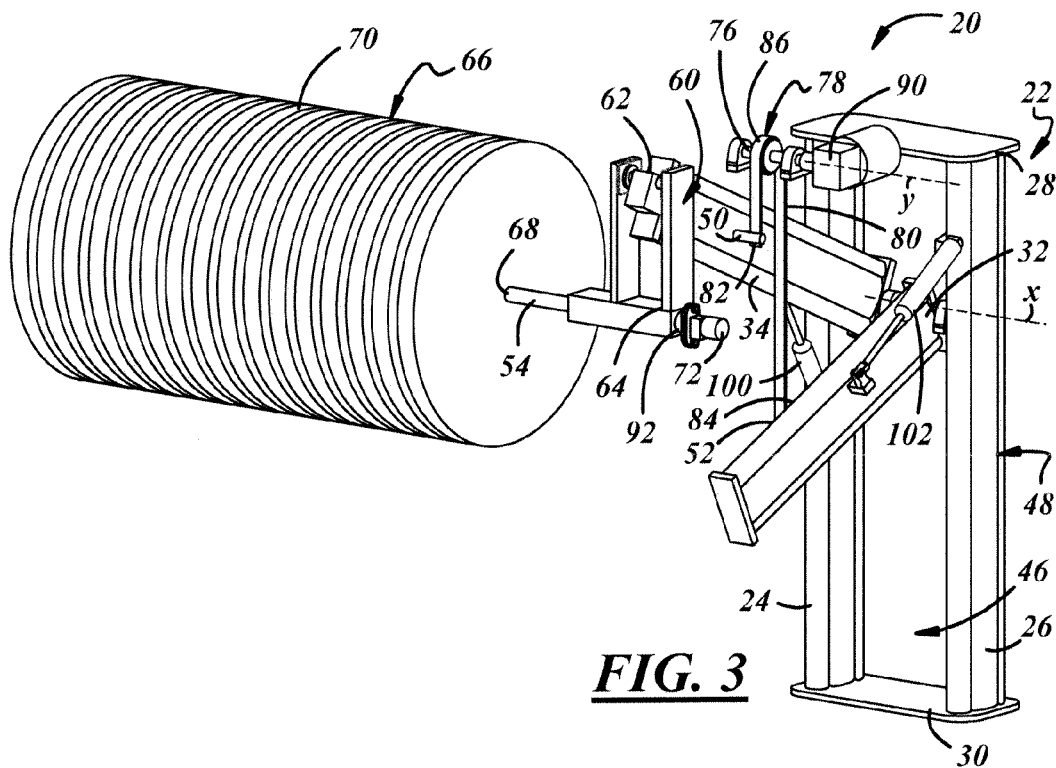
FIG. 3 is a perspective view of a counter-balanced top wheel assembly in accordance with still another embodiment of the present invention.
Figure 4:
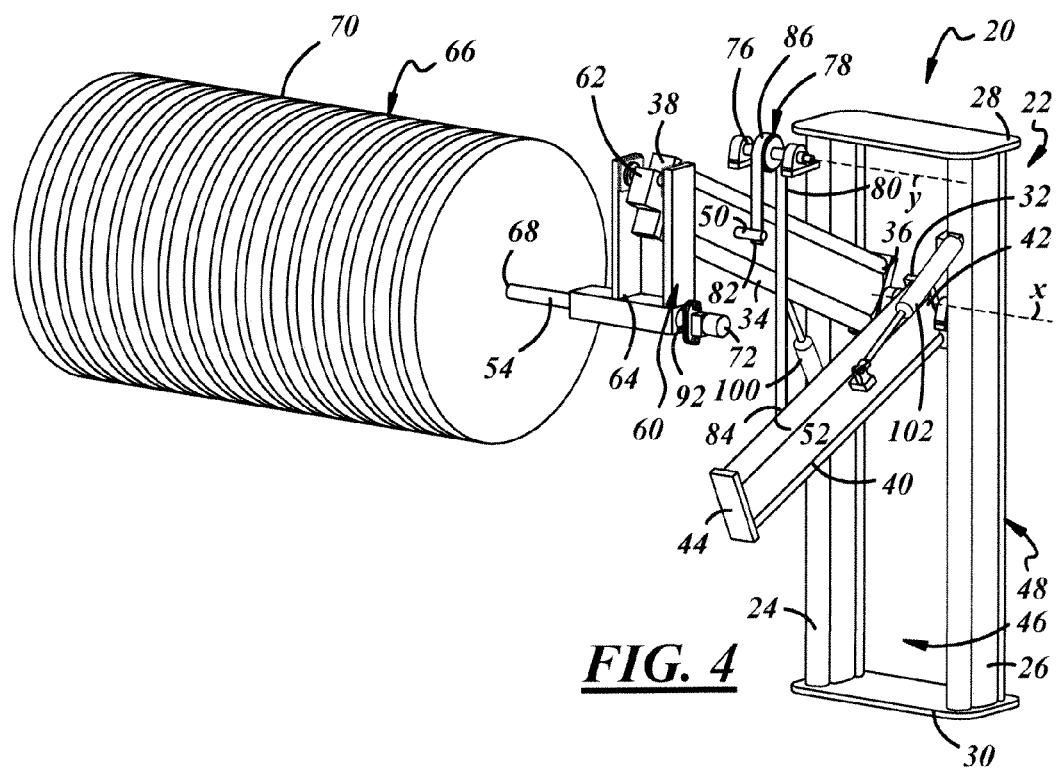
FIG. 4 is a perspective view of counter-balanced top wheel assembly in accordance with yet another embodiment of the present invention.

As seen in FIGS. 3 and 4, the brush support arm 34 may include a secondary arm 60 that is pivotally mounted to the brush support arm 34 adjacent the second end 38. The secondary arm 60 has a first end 62 that is pivotally mounted adjacent the second end 38 of the brush support arm 34 and a second end 64 disposed below the first end 38. The rotatable shaft 54 is secured to the secondary arm 60 adjacent the second end 64 such that it extends perpendicular with respect to the brush support arm 34 and extends over the vehicle bay 14 and into communication with the horizontal path of travel of the vehicle. The secondary arm 60 has more swing and thus allows the brush 66 to give a little more when it is contacted by the vehicle than in the embodiments of FIGS. 1 and 2.

With reference to FIGS. 1 through 4, a brush 66 is disposed on the rotatable shaft 54. As shown, the brush 66 is generally cylindrical and includes a center passage 68 for receipt of the rotatable shaft 54 to secure the brush 66 thereto. The brush 66 is rotatable for laundering the exterior of the vehicle 12 as the vehicle contacts the brush 66 as it proceeds along the predetermined horizontal path of travel. The rotation of the brush 66 is preferably effectuated by a brush motor 72 that is secured to the second end 38 of the brush support arm 34 and is in communication with the rotatable shaft 54. The brush motor 72 is preferably disposed on the opposite side of the brush support arm 34 from the brush 66. However, other suitable ways for rotating the brush 66 may also be employed. It will also be understood that a variety of other ways to attach the shaft 54 to the brush 66.

The brush 66 includes a media 70 disposed around its periphery for contacting and laundering the vehicle 12. It will be understood that the brush 66 can be secured to the rotatable shaft 54 in a variety of suitable ways. It will also be understood that the media 70 for the brush 66 can have a variety of configurations, including a bristle brush, a cloth brush, a buffer, or any other brush known in the art. Preferably, the brush 66 includes a plurality of rings or wheels of media that are assembled together to form a single structure. The term "brush" as used herein refers to a variety of different structures, including cloth materials, synthetic materials with bristles, foam materials, and a variety of other materials, which are suitable for contacting the exterior of the vehicle.

The assembly 20 further includes a balancing pivot arm 76 that is secured to the frame 22. The balancing pivot arm 76 is spaced vertically upward from the pulley support restraints 50, 52. The balancing pivot arm 76 is rotatably coupled to the frame 22 such that it is rotatable about a balancing pivot axis Y. A pulley mechanism 78 is secured to the balancing pivot arm 76 for rotating the pulley mechanism 78 about the balancing pivot axis Y.

The pulley mechanism 78 includes a belt 80 or cable having a first end 82 and a second end 84. The belt 80 engages the pulley mechanism 78 generally in a middle portion 86 such that the first and second ends 82, 84 extend generally downwardly. The first end 82 is connected to the pulley support restraint 50 on the brush support arm 34. The second end 84 is connected to the pulley support restraint 52 on the counterweight support arm 40. The connection of the belt ends 82, 84 together with the engagement of the middle portion 86 of the belt 80 with the pulley mechanism 78 permits relative rotation and angular variation between the brush support arm 34 and the counterweight support arm 40, as discussed in more detail below.

The effect of the pivotal brush support arm 34, the pivotal counterweight support arm 40, and the pulley mechanism 78 is to allow the brush support arm 34 and the counterweight support arm 34 to move equal amounts and in opposite directions. For example, as the brush support arm 34 moves up when the vehicle contacts the brush 66, the counterweight support arm 40 moves downwardly an equal amount. As set forth below, the pulley mechanism 78 also allows the relative positions of the arms to be changed as desired or as necessary, such as to raise the brush 66.

In the embodiments shown in FIGS. 1 and 3, the top wheel assembly 20 includes a pulley motor assembly 90 that is in communication with the balancing pivot arm 76 for effectuating rotation of the balancing pivot arm 76 about the balancing pivot axis Y. The pulley motor assembly 90 is secured to the frame 22. The pulley motor assembly 90 is in communication with the brush motor 72. In addition to rotating the brush 66, the brush motor 72 can also sense the friction or downward force or pressure being applied to the vehicle 12 by the brush 66. The force or pressure can change based on a number of factors, including the absorption of water by the brush media 70 or other known factors in the art that affects the counterbalance. In the event that the penetration of the brush 66 downward is too large, it can be sensed by the brush motor 72. For example, the brush motor 72 can sense a change in the current required to rotate the brush 66, i.e. the motor is having to exert more force to rotate the brush 66. In the event that the current is greater than a predetermined value, a signal can be sent to the pulley motor assembly 90 that causes it rotate the pulley mechanism 78 about the pulley axis of rotation Y to decrease the downward force by the brush 66 on the vehicle 12 by raising the brush 66 and changing the relative positions of the arms 34, 40 equal amounts in opposite directions. Alternatively, a variety of other ways of sensing downward force or penetration are contemplated. Additionally, other ways of changing the position (i.e. raising or lowering) of the brush 66 can also be employed.

In a preferred embodiment, the brush support arm 36 includes a cylinder 100 on an inner surface thereof. The cylinder 100 is in communication with a controller to actuate the cylinder 100 to raise and lower the brush support arm 36. For example, when the vehicle wash process has not been initiated, the brush 66 is in a raised portion. Once the process has been initiated and a vehicle is approaching, the controller signals the cylinder 100 to lower the brush support arm 36 to a vehicle engaging position. Obviously, as the brush support arm 36 is moved, the counterweight support arm 40 also moves. The cylinder 100 is preferably a pneumatic cylinder. However, other suitable cylinders, such as hydraulic cylinders or the like may be utilized. It will also be understood that the cylinder 100 can be located on other portions of the frame 22 and positioned to communicate with the brush support arm 36.

Additionally, the counterweight support arm 40 also includes a cylinder 102 on an inner surface thereof. The cylinder 102 is also in communication with the controller to assist in leveling out the force applied by the brush 66 to the exterior of the vehicle. The cylinder 102 can be activated to vary the force or pressure applied by the brush 66 to the exterior of the vehicle. The force applied by the brush 66 can be varied between cycles or during a given cycle. For example, the controller can signal the cylinder 102 to make the brush 66 apply a heavier load or greater pressure to the hood of the vehicle. Additionally, the controller can signal the cylinder 102 to decrease the weight or force on the roof of the vehicle. Again, the cylinder 102 is preferably a pneumatic cylinder, but may be any type of cylinder or actuator. Again, the cylinder 102 may be located on the frame 22 and in communication with the counterweight support arm.

It will also be understood that the top wheel assembly 20 can also employ a breakaway mechanism. The breakaway mechanism will allow the brush 66 to rotate on its own in the event a vehicle contacts it at a speed greater than that contemplated by the assembly 20 or capable of being handled by the brush motor 72. The breakaway mechanism allows for a freewheel or free breakaway of the brush 66. To accomplish this function, a clutch 92 is disposed in communication with the rotatable shaft 54. The clutch 92 is thus disposed between the brush 66 and the brush motor 72. Thus, if a large force is applied to the assembly 20, the clutch 92 will freewheel to prevent damage to the brush motor 72 or other components of the system. It will be understood that a variety of other breakaway mechanism can be utilized to protect the brush 66 from damage in the event of contact with a vehicle.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A counter-balanced top wheel assembly for laundering a vehicle, comprising:
   a frame;
   a first support pivot arm secured to said frame, said first support pivot arm having an axis of rotation;
   a brush support arm having a first end and a second end, said brush support arm being pivotally mounted to said frame adjacent said first end;
   wherein said first end of said brush support arm is secured to said first support pivot arm;
   a second support pivot arm secured to said frame, said second support pivot arm having an axis of rotation;
   a counterweight support arm having a first end and a second end, said counterweight support arm being pivotally mounted to said frame adjacent said first end;
   wherein said first end of said counterweight support arm is secured to said second support pivot arm;
   wherein said axis of rotation for said first support pivot arm and said axis of rotation for said second support pivot arm are the same;
   a brush in communication with said second end of said brush support arm such that said brush extends over a vehicle bay to launder an exterior of the vehicle; and
   a pulley mechanism, including a strap connecting said brush support arm to said counterweight support arm to allow opposite movements of the arm;
   said second end of said brush support arm and said second end of said counterweight support arm extending from said frame in the same direction.

2. The assembly of claim 1, wherein said first end of said counterweight support arm is secured to said first support pivot arm.

3. The assembly of claim 1, further comprising:
   a balancing pulley shaft secured to said frame and defining a pulley axis of rotation, said pulley mechanism being disposed on said balancing pulley shaft to allow rotation of said pulley mechanism about said pulley axis of rotation to change the relative position of said second end of said brush support arm with respect to said second end of said counterweight support arm.

4. The assembly of claim 3, further comprising:
a motor assembly in communication with said balancing pulley shaft to effectuate rotation of said pulley mechanism to change the respective positions of said brush support arm and said counterweight arm as needed.

5. The assembly of claim 4, further comprising:
a sensor in communication with said brush to determine an amount of penetration of said brush on the vehicle, said sensor being in communication with said motor assembly to effectuate rotation of said pulley mechanism and lifting of said brush.

6. The assembly of claim 3, wherein said pulley mechanism strap having a first end connected to said second end of said brush support arm and a second end connected to said second end of said counterweight support arm.

7. The assembly of claim 1, further comprising:
a secondary support arm having an upper end coupled to said second end of said brush support arm and a lower end in rotatable communication with said brush by a brush shaft.

8. The assembly of claim 1, wherein said brush is connected to said brush support arm by a rotatable shaft, said rotatable shaft is in communication with a brush motor to rotate said brush and launder said exterior of the vehicle.

9. The assembly of claim 8, further comprising:
a clutch in communication with said brush such that in the event a force greater than a predetermined value is applied to said brush by a vehicle, said brush can rotate freely and said brush motor is temporarily removed from communication with said brush.

10. A counter-balanced top wheel assembly for laundering a vehicle, comprising:
a frame proximate the vehicle treatment location;
a brush support arm;
a rotatable shaft extending perpendicularly with respect to said brush support arm;
a brush being cylindrical and defining a center passage for engaging said rotatable shaft, said brush being rotatable for laundering the vehicle and including a media disposed around a periphery thereof for contacting an exterior of the vehicle;
a counterweight support arm;
wherein said brush support arm and said counterweight support arm are mounted on a single support shaft, which is rotatably secured to said frame to rotate said brush support arm and said counterweight support arm about an axis of rotation;
said brush support arm and said counterweight support a extending outwardly from said frame toward one side thereof, each of said brush support arm and said counterweight support arm including a strap engaging mechanism formed thereon; and
a pulley mechanism secured to said frame and having a pulley axis of rotation, said pulley mechanism including a belt having a first end secured to said strap engaging mechanism on said brush support arm and a second end secured to said strap engaging mechanism on said counterweight support arm.

11. The assembly of claim 10, wherein said pulley mechanism permits relative rotation and angular variation between said brush support arm and said counterweight support arm.

12. The assembly of claim 10, wherein said brush support arm and said counterweight support arm are each rotatably mounted to said frame by a separate support shaft.

13. The assembly of claim 10, wherein said pulley mechanism is secured to said frame by a balancing pivot arm.

14. The assembly of claim 13, further comprising a motor assembly in communication with said balancing pivot arm to effectuate rotation of said pulley mechanism about said pulley axis of rotation.

15. The assembly of claim 10, further comprising:
a sensor in communication with said brush to determine an amount of pressure of said brush with respect to the vehicle, said sensor being in communication with said motor assembly to effectuate rotation of said pulley mechanism to change the respective positions of said brush support arm and said counterweight arm as needed to lift said brush.

16. The assembly of claim 10, further comprising:
a secondary support arm that has an upper end rotatably connected to a second end of said brush support arm and a lower end connected to said rotatable shaft.

17. The assembly of claim 10, wherein said media disposed around a periphery of said brush consists of a cloth material.

18. The assembly of claim 10, wherein said rotatable shaft is in communication with a brush motor to rotate said brush and launder said exterior of the vehicle.

19. The assembly of claim 18, further comprising:
a clutch in communication with said brush such that in the event a force greater than a predetermined value is applied to said brush by a vehicle, said brush can rotate freely and said brush motor is temporarily removed from communication with said brush.

20. A counter-balanced top wheel assembly for laundering a vehicle, comprising:
a frame;
a first support pivot arm secured to said frame, said first support pivot arm having an axis of rotation;
a brush support arm having a first end and a second end, said brush support arm being pivotally mounted to said frame adjacent said first end;
wherein said first end of said brush support arm is secured to said first support pivot arm;
a second support pivot arm secured to said frame, said second support pivot arm having an axis of rotation;
a counterweight support arm having a first end and a second end, said counterweight support arm being pivotally mounted to said frame adjacent said first end;
wherein said first end of said counterweight support arm is secured to said second support pivot arm;
wherein said axis of rotation tier said first support pivot arm and said axis of rotation for said second support pivot arm are the same; and
a brush in communication with said second end of said brush support arm such that said brush is configured to extend over a vehicle bay to launder an exterior of the vehicle;
wherein said brush support arm is operatively connected to said counterweight support arm to allow opposite movements of the arms.

21. The assembly of claim 20, further comprising a pulley mechanism;
wherein said brush support arm is operatively connected to said counterweight support arm via a pulley mechanism to allow opposite movements of the arms.

22. The assembly of claim 21, further comprising:
a balancing pulley shaft secured to said frame and defining a pulley axis of rotation, said pulley mechanism being disposed on said balancing pulley shaft to allow rotation of said pulley mechanism about said pulley axis of rotation to change the relative position of said second end of said brush support arm with respect to said second end of said counterweight support arm.

23. The assembly of claim 21, further comprising:
a secondary support arm having an upper end coupled to said second end of said brush support arm and a lower end in rotatable communication with said brush by a brush shaft.

24. The assembly of claim 23, further comprising:
a motor assembly in communication with said balancing pulley shaft to effectuate rotation of said pulley mechanism to change the respective positions of said brush support arm and said counterweight arm as needed.

25. The assembly of claim 24, further comprising:
a sensor in communication with said brush to determine an amount of penetration of said brush on the vehicle, said sensor being in communication with said motor assembly to effectuate rotation of said pulley mechanism and lifting of said brush.

26. The assembly of claim 20, wherein said brush is connected to said brush support arm by a rotatable shaft, said rotatable shaft is in communication with a brush motor to rotate said brush and launder said exterior of the vehicle.

27. The assembly of claim 20, wherein said first end of said counterweight support arm is secured to said first support pivot arm.

28. The assembly of claim 27, further comprising:
a clutch in communication with said brush such that in the event a force greater than a predetermined value is applied to said brush by a vehicle, said brush can rotate freely and said brush motor is temporarily removed from communication with said brush.

* * * * *